United States Patent [19]

Kozak et al.

[11] Patent Number: 4,901,520
[45] Date of Patent: Feb. 20, 1990

[54] GAS TURBINE PRESSURIZED COOLING SYSTEM

[75] Inventors: Andrew Kozak, Canton, Mass.; George Minkkinen, Fairfield, Conn.

[73] Assignee: Avco Corporation, Providence, R.I.

[21] Appl. No.: 231,774

[22] Filed: Aug. 12, 1988

[51] Int. Cl.$^4$ .............................................. F02C 3/02
[52] U.S. Cl. ........................... 60/39.02; 60/39.07; 60/39.75; 60/726; 415/115; 415/116
[58] Field of Search ............... 60/39.02, 39.75, 39.161, 60/39.83, 39.07, 726, 262; 415/115, 116, 175; 416/90 R, 97 R

[56] References Cited

U.S. PATENT DOCUMENTS

| | | |
|---|---|---|
| Re. 12,317 | 2/1905 | Fullagar . |
| 2,618,433 | 11/1952 | Loos et al. ........................ 415/115 |
| 2,672,013 | 3/1954 | Lundquist ........................ 415/116 |
| 2,940,660 | 6/1960 | Caddell . |
| 3,663,118 | 5/1972 | Johnson ........................... 415/116 |
| 4,063,851 | 12/1977 | Weldon ............................ 415/115 |
| 4,086,757 | 5/1978 | Karstensen . |
| 4,153,386 | 5/1979 | Leogrande et al. ............... 415/115 |
| 4,162,136 | 7/1979 | Parkes .............................. 415/115 |
| 4,217,755 | 8/1980 | Williams . |
| 4,236,869 | 12/1980 | Laurello .......................... 415/115 |
| 4,297,077 | 10/1981 | Durgin et al. .................... 415/115 |
| 4,312,624 | 1/1982 | Steinbauer, Jr. et al. ......... 415/115 |
| 4,461,612 | 7/1984 | Dodd ................................ 415/115 |

*Primary Examiner*—Donald E. Stout
*Attorney, Agent, or Firm*—Perman & Green

[57] ABSTRACT

A system for cooling a turbine assembly in a gas turbine engine. The system has a bleed means for bleeding a portion of a first core of gas exited from a compressor section of the engine to thereby form a second core of gas. The second core of gas is additionally pressurized by a second compressor means to increase the pressure of the second core of gas. The second core of gas is then delivered to the turbine section for cooling of the engine such that the second core of coolant gas has a higher pressure than the first core of gas exiting the combustor section.

14 Claims, 3 Drawing Sheets

GAS TURBINE PRESSURIZED COOLING SYSTEM

BACKGROUND OF THE INVENTION

1. Field of the Invention

This invention relates to a system for cooling a turbine assembly in a gas turbine engine and, more particularly, to a gas cooling system having an additional compressor section as a means to increase the pressure of the coolant.

2. Prior Art

High performance gas turbine engines for use in aircraft and in industrial gas turbine engine operating at ever increasing turbine inlet temperatures in order to meet desired power performance and fuel economy goals. In order to allow for higher turbine inlet temperatures without damaging the turbine assembly two approaches have generally been used. First, high-temperature materials, such as metals and ceramics, have been used in the components of the turbine assembly. Second, the flow of coolant, such as compressed air, has been used to cool the highly stressed turbine components.

Generally, cooling of the turbine assembly, by use of a coolant, is accomplished by such techniques as convection cooling, impingement cooling, film cooling and transpiration cooling. These types of cooling techniques are generally used on the stator vanes, the turbine blades and even the front and rear face of the turbine disks. The compressed air coolant is generally bled or taken from the compressed air which the main compressor produces for introduction into the combustors of the engine. The bled air is then transported to the turbine assembly to be used for cooling.

In film cooling, the coolant is generally into passages in vanes and blades and allowed to exit the vanes and blades through apertures along their outside surfaces In leading edge film cooling the coolant exits the leading edge or the edge of the vane or blade closest to the combustors. The coolant flows along the outside surface of the vane or blade, thus forming an insulating blanket of cooler air between the metal and hot gases from the combustors.

However, a problem arises in presently used cooling systems in that the coolant can be supplied to the turbine assembly without sufficient pressure to provide the flow needed for adequate cooling.

A further problem arises in presently used systems using film cooling in that pressure of the main core of gases must be lowered in the combustors in order to prevent the pressure of the main core of gases from overcoming the pressure of the coolant, preventing proper cooling and thereby damaging the turbine assembly.

A further problem arises in presently used cooling systems in that pressure drops in the main core of gases in the combustors causes fuel inefficiency and energy loss in the engine.

SUMMARY OF THE INVENTION

The foregoing problems are overcome and other advantages are provided by a system for cooling a gas turbine engine. The system uses a second compressor means to additionally pressurize bleed gas for delivery to the turbine assembly of the engine.

In accordance with one embodiment of the invention, a portion of the pressurized gas exited from the compressor section of a gas turbine engine is bled to form a secondary core of coolant gas. A coolant gas compressor means is provided for compressing the coolant gas to thereby increase its pressure. The increased pressure cooling gas is then delivered to the turbine assembly such that the coolant gas can be introduced back into the main core of gas while cooling the turbine assembly and preventing damage from the heat in the main core of gas.

In accordance with another embodiment of the invention, the coolant gas compressor means is driven by an accessory drive shaft. A sensor means and a control means can also provided to regulate the coolant compressor means and thereby regulate the pressure of the coolant gas. The coolant gas an be delivered to the turbine assembly by stator vanes having leading edge coolant injection means.

In accordance with one method of the invention, the method comprises the steps of bleeding pressurized gas from gas exiting the compressor section of the engine to thereby form a secondary core of coolant gas. The coolant gas is then pressurized by a compressor means to thereby increase the pressure of the coolant gas. The increased pressure coolant gas is then delivered to the turbine assembly for reintroduction into the main core of gas and cooling of the turbine assembly.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
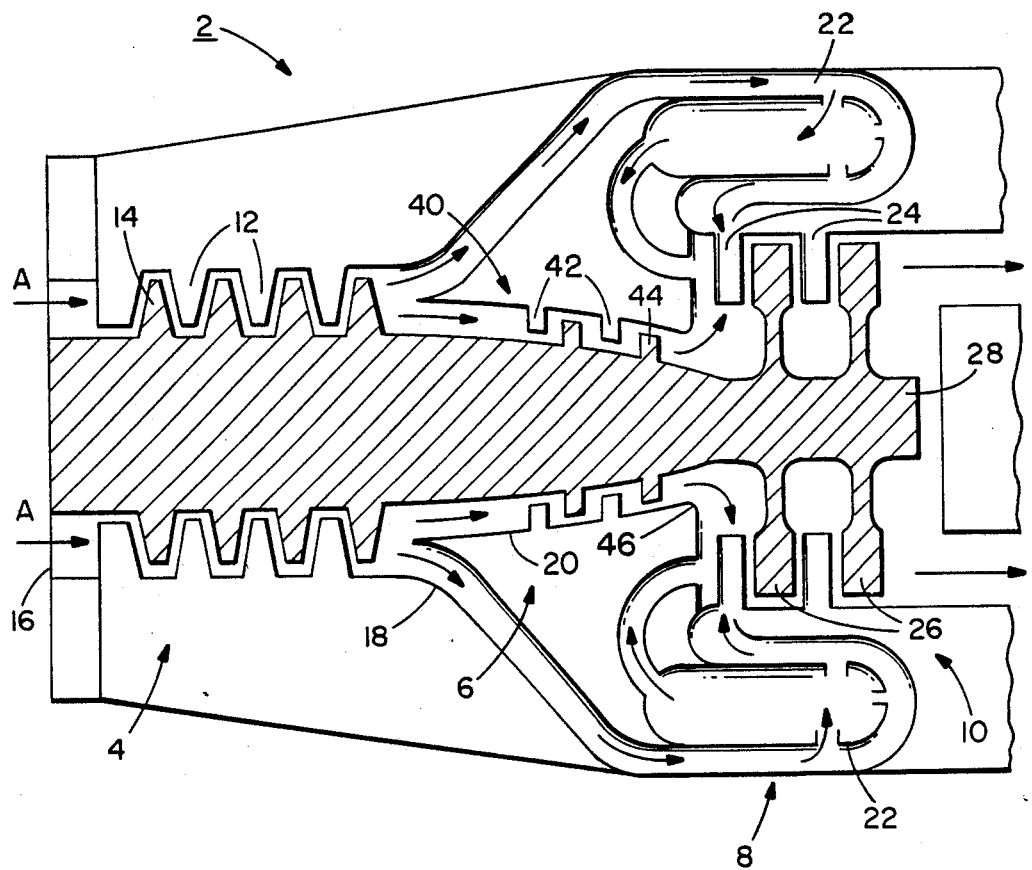
FIG. 1 is a diagrammatical view of a gas turbine engine incorporating features of the invention.

Referring to FIG. 1, there is shown a diagrammatical view of a gas turbine engine 2 incorporating features of the invention. Although the invention will be described with reference to the embodiments shown in the Figures, it is to be understood that the present invention is intended for use in all gas turbine engines having turbine cooling. In the embodiment shown, the gas turbine engine 2 generally has four main sections; a main compressor section 4, a second coolant compressor section 6, a combustion section 8, and a turbine section 10.

The first main compressor section 4, is located in the forward portion of the engine 2 and generally comprises two main air interaction members; stationary stator vanes 12 and rotatable compressor blades 14. The main compressor section 4, in this embodiment, can generally be described as having four compressor stages with each stage comprising a wheel or ring-like set of stationary stator vanes 12 and a rotatable wheel of compressor blades 14. Although this embodiment shows only a single axial flow compressor assembly having four stages in the main compressor section 4, the main compressor section 4 may have any number of stages or more than one axial compressor assembly or a centrifugal compressor assembly. The main compressor section 4 communicates with an air inlet 16. The air inlet 16 allows air located outside the engine 2 to enter into the main compressor section 6 as shown by flow arrows A. The main compressor section 4, by revolving the compressor blades 14, can draw air into the engine 2 and compress the air into a smaller volume which in turn pressurizes the air. Thus, the main compressor section 4 produces a pressurized or compressed main core or flow path of gas for further flow through the engine 2.

Generally located behind the main compressor section 4 is a diffuser housing 18 which acts as a conduit to transport the compressed core of air from the main compressor 4 to the combustion section 8. In the embodiment shown, a second conduit 20 is provided for bleeding or redirecting a portion of the main core of compressed air for use as a coolant in the turbine section 10 of the engine 2. A more detailed description of turbine section cooling will be described below.

The combustion section 8 generally comprises a series of combustors 22. The main core of compressed air is pushed by new inlet air and the main compressor section 4 into the combustors 22. The air in the combustors is mixed with fuel and burned to increase the temperature of the gases. The hot gases are allowed to exit the combustors 22 into the turbine section 10 of the engine 2. The turbine section 10 generally comprises stationary stator vanes 24 and rotatably mounted turbine blades 26. The general function of the turbine section 10 is to drive the compressor and accessories, and in the case of a turboprop engine, the propeller, by extracting a portion of the pressure and kinetic energy from the high-temperature combustion gases. To accomplish this function, the turbine blades 26 are connected to a main drive shaft 28. The main drive shaft 28 also has the compressor blades 14 of the main compressor section 4 connected thereto. The exiting gases from the combustors 22, with the directional aid of the turbine stator vanes 24, force the turbine blades 26 to revolve about the center axis of the drive shaft 28 which in turn causes the drive shaft 28 to revolve thereby turning the compressor blades 14 in the main compressor section 4 to compress the inlet air.

Figure 2:
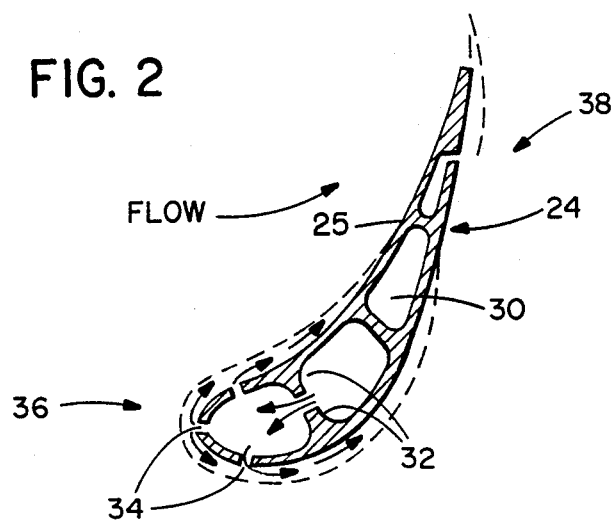
FIG. 2 is a cross-sectional view of a turbine vane having a cooling means.

Referring now to FIG. 2, there is shown a cross-sectional view of a stator vane 24 in the turbine section 10. Because the exiting main core of gases from the combustion section 8 have a relatively high temperature, portions of the turbine section 10 must be cooled to prevent potential damage from these relatively hot gases. Although the invention will be described in use with the vane 24 shown in FIG. 2, it is to be understood that the present invention can be used for all portions of the turbine section 10 including the turbine blades 26.

In the embodiment shown, the vane 24 uses three types of cooling methods to prevent damage from the combustion gases. All three methods, however, use the bleed air which has been bled from the main core of compressed air before the combustors 22. As shown in FIG. 2, the vane 24 comprises a housing 25 having a plurality of conduits 30 traveling therethrough. Compressed air is supplied to the conduits 30 by a suitable conduit means (not shown) from the coolant compressor section 6 and travels therethrough absorbing heat via convection. The heated coolant air is allowed to exit the vane 24 and thereby cools the vane 24. The conduits 30 also have suitable heat transfer members 32 located therein to allow for impingement cooling. Film cooling is also provided in this embodiment in both a leading edge 36 and trailing edge 38 of the vane 24. As shown in the embodiment, apertures 34 are provided between the conduits 30 and the exterior of the vane 24 at both the leading edge 36 and the trailing edge 38. The compressed air coolant, located in the conduits 30 having apertures 34, can thus exit the vane 24 via the apertures 34. The coolant exited at the apertures 34 is made to flow along the outside surface of the vane 24 by the flow of the hot combustion gases therearound. The coolant thus forms an insulating blanket of cooler air between the vane 24 and the hot gases. Similar cooling can also be provided for the turbine blades 26 and other turbine parts.

Referring back to FIG. 1, the compressed air coolant which is supplied to the turbine section 10, as described above, is bled from the main core of compressed air exited from the main compressor section 4 to form a second core or flow path of coolant gas. The second compressor section 6 is generally provided for further compressing or pressurizing the coolant gas separate and apart from the main core of gas traveling to and through the combustors 22. The coolant compressor section 6, in this embodiment, generally comprises an axial flow compressor assembly 40 having two stages of stationary stator vanes 42 and rotatable compressor blades 44. However, any number of stages can be provided. In addition, the compressor assembly may be a centrifugal compressor. In the embodiment shown, the compressor blades 44 are connected to the main drive shaft 28 such that the turbine section 10 and drive shaft 28 drive both the main compressor section 4 and the coolant compressor section 6. The conduits 20 provides a path for the bleed air, diverted from the main core of compressed air via bleed valves (not shown), to access the coolant compressor section 6. The bleed air, upon entering the coolant compressor section 6, can be compressed or pressurized to a higher degree than the main core of compressed air traveling to and through the combustors 22. The coolant compressor section 6 acts on the bleed air similar to the air compressors known in the art whereby both aerodynamic and thermodynamic principles allow the air to be compressed without incurring a substantial temperature rise.

As the second core of increased pressure bleed air is pushed through the coolant compressor assembly 40 a coolant delivery conduit 46 is provided to define a path for the increased pressure bleed air to access the turbine assembly 10. Although any suitable type of conduit 46 can be used to deliver the increased pressure bleed air, in the embodiment shown, the coolant is delivered to conduits 30 in the stator vanes 24 as shown in FIG. 2. The coolant is allowed to exit the vane 24 at the apertures 34 in the leading edge 36 of the vane. The combustion gases passing around the vane 24 are prevented from entering the apertures 34 because the coolant in the vane 24 has a higher pressure than the combustion gases surrounding the vane and therefore prevents damage to the vane 24 which might otherwise occur by the entry of combustion gases into the vane via the apertures 34.

As can be seen from this embodiment, by providing the coolant compressor section 6 for the coolant bleed air, a desired pressure differential between the coolant and the hot core of gases exited from the combustors 22 can be achieved. This assures that the hot gases from the combustors will not be injected into the vanes 24. It also provides a more efficient engine 2 which allows compressing a relatively small amount of coolant air rather than compressing the entire core of air, bleeding of the cooling air and then inducing a pressure drop in the main core of air. Additional heat transfer members 32 or inserts can also be provided in the conduits 30 of the vane 24 with the pressure of the coolant still being sufficient to properly exit the apertures 34.

In operation, air is taken from the inlet 16 and compressed via the main compressor section 4. The exiting compressed air from the compressor section 4 takes two paths. A first main path is provided to the combustors 22 in the combustion section 8. A second bleed air path is provided to the coolant compressor section 6. The air in the first path is mixed with fuel in the combustors 22 and burned. The hot gases from the combustors are allowed to exit the engine via the turbine section 10. The air in the second path enters the coolant compressor section 6 and is additionally compressed. The increased pressure coolant is then provided to the turbine assembly 10 to provide cooling to the components of the assembly 10.

Figure 3:
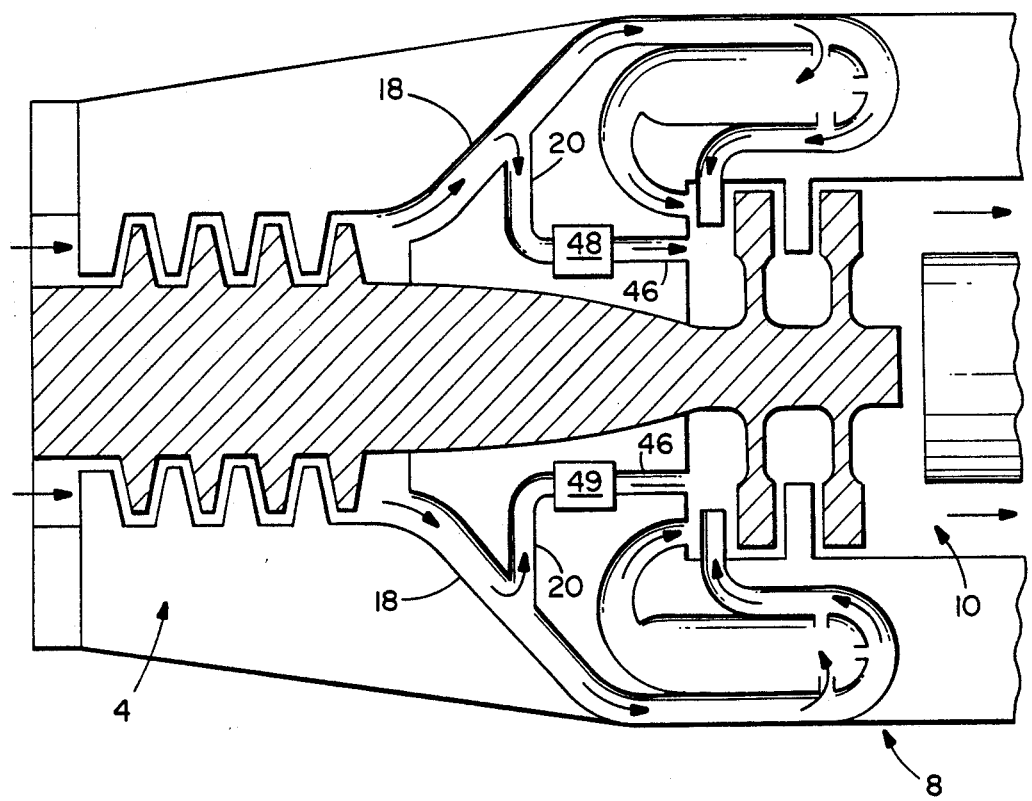
FIG. 3 is a diagrammatical view of a gas turbine engine incorporating an alternate embodiment of the invention.
Figure 4:
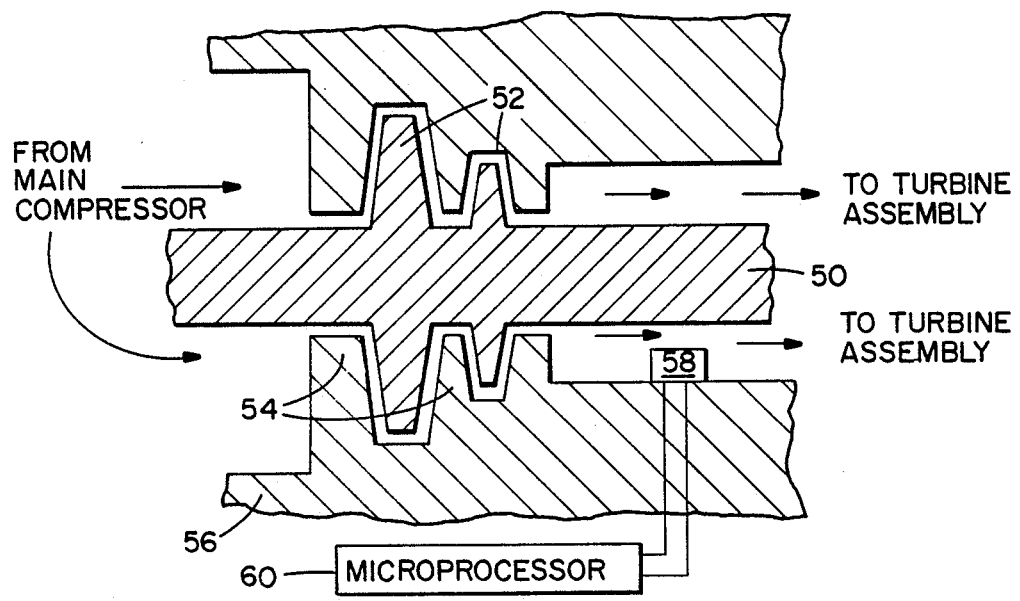
FIG. 4 is an enlarge cross-sectional diagrammatical view of a portion of a coolant compressor.

Referring now to FIG. 3, a diagrammatical view of an alternate embodiment of the invention is shown. In this embodiment, the coolant compressor section 6 comprises two compressors 48 and 49 which are independently driven by accessory drive shafts (not shown). Although two separate compressors 48 and 49 are shown in this embodiment, any number of separate compressors can be used. Referring also to FIG. 4, a diagrammatical cross-sectional view of one of the coolant compressors 48 of FIG. 3 is shown. Bleed air is transported to the compressor 48 via the bleed conduit 20. The compressor 48 has a shaft 50 having compressor blades 52 connected thereto. Stator vanes 54 are provided with a housing 56 which communicates with the bleed air conduit 20 and the coolant delivery conduit 46. The bleed air is transported to the compressor 48 via conduit 20 where it is compressed and delivered to the turbine section 10 by the coolant conduit 46. The compressor shaft 50 is connected to a suitable drive means 62 (not shown) which can turn the shaft 50 about its axis and thereby revolve the compressor blades 52 to compress the coolant. In this embodiment, the compressor 48 is also provided with a sensor 58 for sensing the pressure of the coolant air as it exits the compressor 48. The sensor is connected to a suitable control means, such as a micro-processor 60 which can receive information from the sensor 58 and can adjust the speed of the shaft 50 to thus control the pressure of the coolant.

Figure 5:
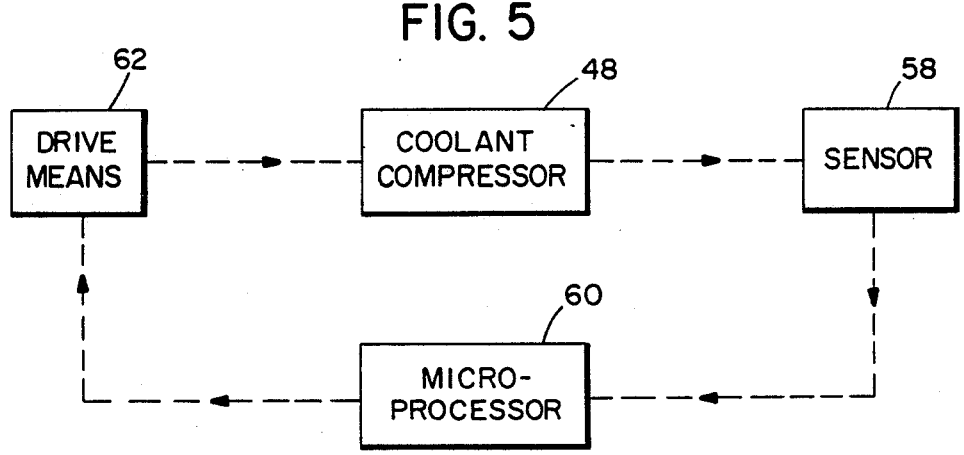
FIG. 5 is a block diagram of the control system for a coolant compressor using a sensor, micro-processor and drive means.

Referring also to FIG. 5, a block diagram of the control of the coolant compressor 48 is shown. The sensor 58 can determine the coolant pressure being produced by the coolant compressor 48. The sensor 58, in turn, can send information to the micro-processor 60. The micro-processor 60 can regulate the drive means 62 which drives the compressor 48. In the event the coolant pressure is too low, the micro-processor 60 can sense this via the sensor 58 and can increase the power to the drive means 62 thereby increasing the rate of compression by the compressor 48. In the event the coolant pressure is too high, the micro-processor 60 can sense this via the sensor 58 and can decrease the power to the drive means 62 thereby decreasing the rate of compression by the compressor 48. Thus, the pressure of the coolant gas can be regulated such that the compressor operates efficiently and without substantial risk of insufficient coolant gas pressure.

Referring back to FIG. 3, the bleed conduit 20 is shown positioned after a radial bend in the diffuser housing 18. In this manner, the bleed air is diverted from the housing 18 with a substantial amount of any contaminate particles having been centrifuged away from the inlet to the conduit 20. As such, the bleed air is relatively clean and will therefore not have foreign particles clog or block the apertures 34 in the vanes 24.

Although the present invention has been described with reference to specific embodiments, it should be understood that the present invention can be used in various alternate embodiments. Any suitable means can be used to conduit the bleed air to the coolant compressor section 6. Any suitable means can be used to conduit the increased pressure coolant to various parts in the turbine section 10. Any type of suitable compressor means can be used as the coolant compressor. With the use of the present invention, although the pressure in the combustors 22 must be lowered such that the combustion chamber pressure is lower than the compressor discharge pressure in order to establish a rearward directional flow of the air, the pressure in the combustors 22 does not have to be additionally lowered to accommodate the allowance of cooling in the turbine section via bleed air. Thus, an engine can operate with a turbine section cooling system, but with an increase efficiency in operation with the pressure in the combustors 22 being relatively high.

It should be understood that the foregoing description is only illustrative of the invention. Various alternatives and modifications can be devised by those skilled in the art without departing from the spirit of the invention. Accordingly, the present invention is intended to embrace al 1 such alternatives, modifications and variances which fall within the scope of the appended claims.

What is claimed is:

1. A system for cooling a turbine assembly in a gas turbine engine, said gas turbine engine having a compressor section with a first gas compressor means, a combustor section, turbine section and a first core of gas passing therethrough, the system comprising:

coolant supply means comprising bleed means for bleeding pressurized gas from the first core of gas to thereby form a second core of coolant gas; second compressor means for additionally pressurizing the second core of coolant gas to thereby increase the pressure of the second core of coolant gas such that the pressure of the second core of coolant gas is greater than the pressure of the first core of gas, said second compressor comprising a gas compressor driven by an accessory drive shaft; and conduit means for delivering the increased pressure second core of coolant gas from said second compressor means to said turbine section whereby the second core of coolant gas has a higher pressure at said turbine assembly than the first core of gas.

2. A system as in claim 1 wherein said second compressor means comprises an axial-flow compressor.

3. A system as in claim 1 wherein said second compressor means comprises a centrifugal compressor.

4. A system as in claim 1 wherein said second compressor means comprises a multi-stage compressor.

5. A system as in claim 1 wherein said accessory drive shaft is controlled by a control means.

6. A system as in claim 1 further comprising a second compressor means sensor means.

7. A system as in claim 1 wherein said conduit means comprises stator vane means having leading edge coolant injection means.

8. A system as in claim 7 wherein said stator vane means has internal heat transfer means for impingement cooling.

9. A system as in claim 1 wherein said delivery means comprises stator vane means having trailing edge cooling means.

10. A method of cooling a turbine assembly in a gas turbine engine, said gas turbine engine having a compressor section with a first gas compressor means, a combustor section, a turbine section and a first core of gas passing therethrough, the method comprising the steps of:
   bleeding pressurized gas from the first core of gas at a point at least partially past said first compressor section to thereby form a second core of gas;
   compressing said second core of gas by means of a second compressor means to thereby increase the pressure of the bleed gas such that the pressure of the second core of gas is greater than the pressure of the first core of gas, said second compressor means being driven by an accessory drive shaft of the engine; and
   delivering the increased pressure bleed gas to said turbine section whereby the bleed gas has a higher pressure at said turbine section than the first core of gas.

11. A method of cooling as in claim 10 wherein the step of delivering the increased pressure bleed gas to said turbine assembly comprises directing the bleed gas coolant into stator vane means and exiting the bleed gas coolant through leading edges of said stator vane means.

12. A method of cooling as in claim 10 further comprising the step of controlling the second compressor means by means of a sensor means and a microprocessor means.

13. A method of cooling as in claim 10 further comprising the step of at least partially reintroducing a portion of the second core of gas into the first core of gas.

14. A system for cooling a turbine assembly in a gas turbine engine, the engine having a compressor section with a first gas compressor means, a combustor section, a turbine section, and a first gas conduit for passing a first core of gas through the engine, the system comprising:
   coolant supply means comprising bleed means for bleeding pressurized gas from the first core of gas to thereby form a second core of coolant gas;
   means for additionally pressurizing the second core of coolant gas to thereby increase the pressure of the second core of coolant gas such that the pressure of the second core of coolant gas is greater than the pressure of the first core of gas;
   means for delivering the increased pressure second core of coolant gas from said pressuring means to said turbine section; and
   means for independently controlling said pressurizing means relative to rotation of a main drive shaft of the engine to thereby independently control the pressure of gas flowing through said delivering means for predetermined conditions.

* * * * *